United States Patent
Salvador

(10) Patent No.: US 9,986,318 B2
(45) Date of Patent: May 29, 2018

(54) OPTICAL ROUTING

(71) Applicant: LENOVO (Singapore) PTE. LTD., New Tech Park (SG)

(72) Inventor: Marcos Rogerio Salvador, Americana (BR)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 178 days.

(21) Appl. No.: 15/005,768

(22) Filed: Jan. 25, 2016

(65) Prior Publication Data

US 2017/0214985 A1   Jul. 27, 2017

(51) Int. Cl.
*H04J 14/00* (2006.01)
*H04Q 11/00* (2006.01)
*H04L 12/725* (2013.01)

(52) U.S. Cl.
CPC ........ *H04Q 11/0066* (2013.01); *H04L 45/30* (2013.01); *H04Q 2011/0073* (2013.01); *H04Q 2011/0077* (2013.01)

(58) Field of Classification Search
CPC ....... H04Q 11/0066; H04Q 2011/0077; H04Q 2011/0073; H04L 45/30
USPC .......................................................... 398/49
See application file for complete search history.

(56) References Cited

U.S. PATENT DOCUMENTS

| 2002/0089974 A1* | 7/2002 | Leme ...................... H04L 27/30 370/352 |
| 2011/0236013 A1* | 9/2011 | Gazzola .............. H04J 14/0258 398/5 |

\* cited by examiner

*Primary Examiner* — Tesfaldet Bocure
(74) *Attorney, Agent, or Firm* — Kunzler, PC

(57) ABSTRACT

For optical routing, a processor detects an optical data packet communicated over at least one optical subcarrier of a plurality of optical subcarriers. The processor further detects each of the plurality of optical subcarriers over which the optical data packet is carried. The processor generates a label including one or more asserted optical subcarrier values corresponding to each of the plurality of optical subcarriers over which the optical data packet is carried. In addition, the processor routes the optical data packet from the optical switch based on a routing action associated with the label.

18 Claims, 14 Drawing Sheets

101

US 9,986,318 B2

OPTICAL ROUTING

FIELD

The subject matter disclosed herein relates to routing and more particularly relates to optical routing.

BACKGROUND

Description of the Related Art

Data is often routed between nodes in a network.

BRIEF SUMMARY

An apparatus for optical routing is disclosed. The apparatus includes an optical switch, a processor, and a memory. The optical switch switches optical data. The memory stores code. The processor executes the code. The processor detects an optical data packet communicated over at least one optical subcarrier of a plurality of optical subcarriers. The processor further detects each of the plurality of optical subcarriers over which the optical data packet is carried. The processor generates a label including one or more asserted optical subcarrier values corresponding to each of the plurality of optical subcarriers over which the optical data packet is carried. In addition, the processor routes the optical data packet from the optical switch based on a routing action associated with the label. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
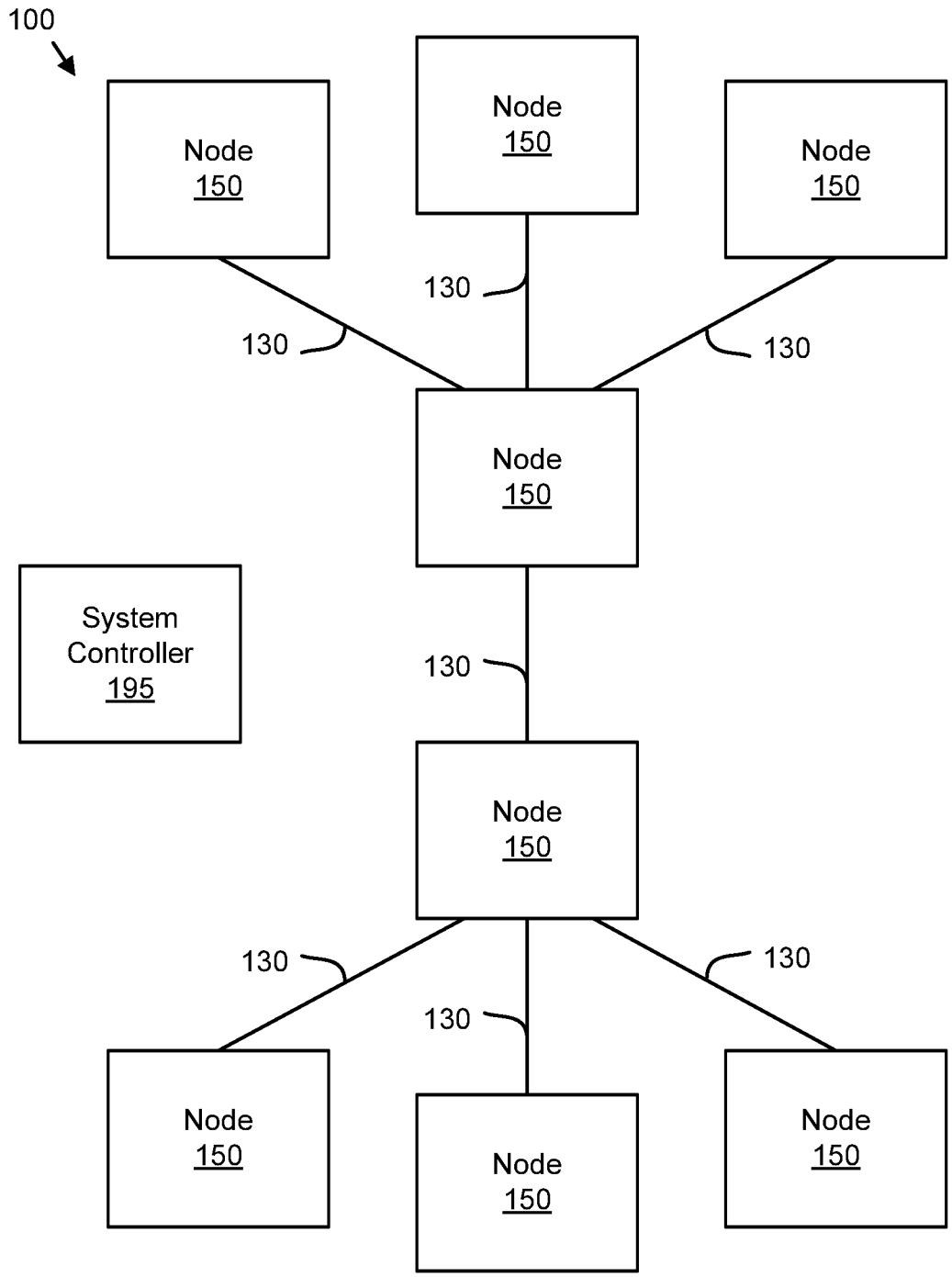
FIG. 1A is a schematic block diagram illustrating one embodiment of an optical network.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of an optical network 100. In one embodiment, the network 100 connects nodes 150 within a data center. Nodes 150 may include parts of or be in communication with traditional packet switches. A packet switch in this context is any software and/or hardware apparatus that routes data packets based on the electronics and/or software processing and switching of packets. Alternatively, one or more nodes 150 may be servers. The nodes 150 communicate over optical fiber 130. In one embodiment, nodes 150 may be intermediate nodes such as optical switches including optical switch fabrics. For simplicity, a single basic topology of nodes 150 is shown. However, the nodes 150 may be interconnected with optical fiber 130 using any topology.

The network 100 may include a system controller 195. The system controller 195 may be a Software Defined Networking (SDN) controller and/or a network management system. The system controller 195 may manage one or more label resolution tables, label information bases, and/or forward equivalence class resolution tables as will be described hereafter.

The optical fiber 130 supports high-bandwidth communication between the nodes 150. For example, the optical fiber 130 may carry optical data packets between two nodes 150 at very high bit rates. In traditional networking, when an optical data packet arrives at a node 150 over an optical fiber 130, that optical data packet must be converted into the optical data packet's electronic form and the (now-in-electronics) data packet's header and/or content must be parsed and processed, according to their network protocol encapsulation, to determine where to route the data packet that is now in electronics form. The data packet must then be electronically or software switched over the determined output port(s) and randomly delayed till the data packet can be transmitted over the optical fiber towards the destination, at which time a new optical data packet is created. All these operations, with the exception of the optical transmission of the data packet, are performed by electrical circuitry and/or software and the electrical circuitry adds complexity, cost, performance penalties and protocol dependencies.

The embodiments described herein optically routes the optical data packets within the nodes 150. As a result, the transmission rate of the optical data packets is not only high between nodes 150, but is also high with low and stable packet and packet variation delays when transmitting optical data packets through multiple nodes 150. In addition, the header and the contents of the optical data packet need not be parsed and interpreted as will be described hereafter. Communications between nodes 150 and particularly through intermediate nodes 150 may be scalable to higher bit rates and may be agnostic to the protocols of the electronic data packets.

Figure 1B:
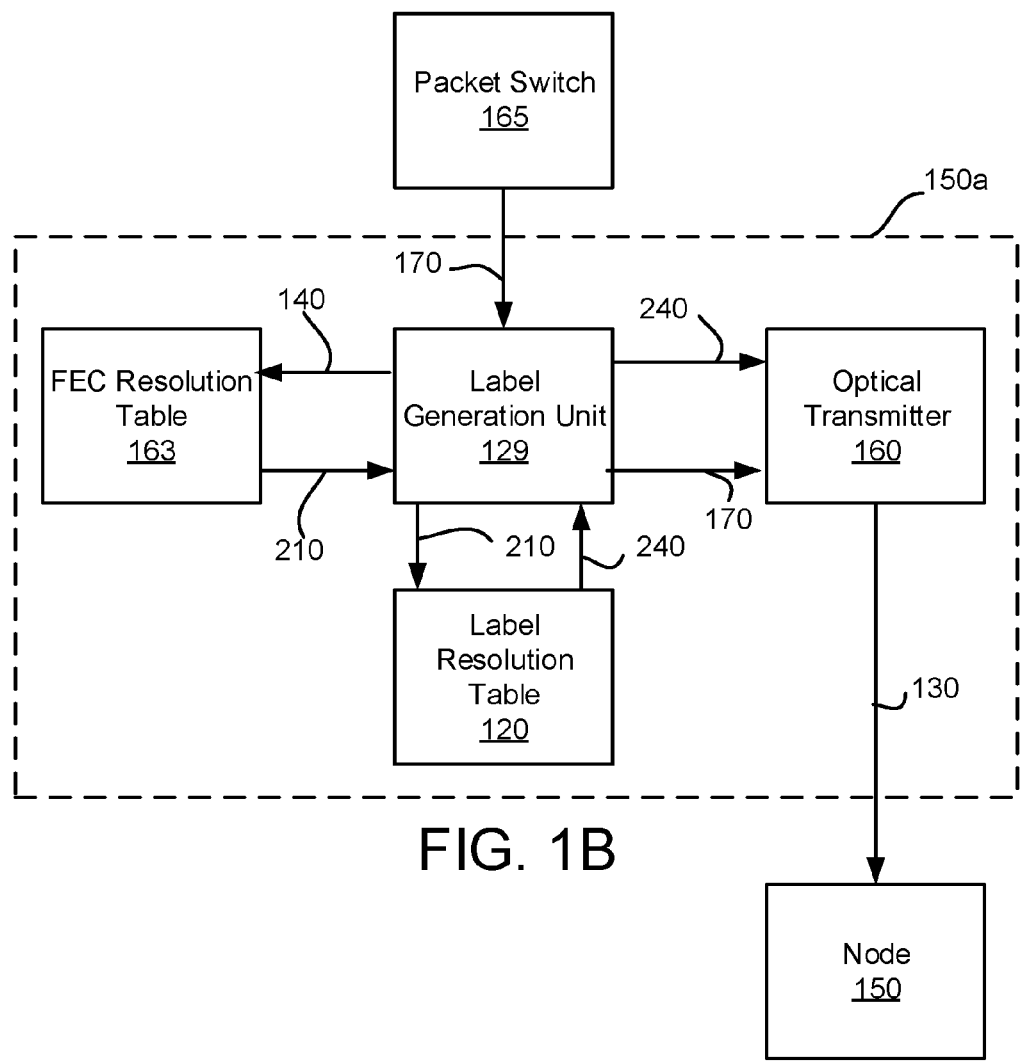
FIG. 1B is a schematic block diagram illustrating one embodiment of an optical transmitter node.

FIG. 1B is a schematic block diagram illustrating one embodiment of an optical transmitter node 150a. The optical transmitter node 150a may transmit an optical data packet over optical fiber 130 to another node 150. For simplicity, only the transmission elements of the node 150a are shown. The optical transmitter node 150a includes a Forward Equivalence Class (FEC) resolution table 163, a label generation unit 129, a label resolution table 120, and an optical transmitter 160.

The label generation unit 129 may receive a data packet 170 from a packet switch 165. The data packet 170 may be an electronic data packet and be structured as a layer 2 or a layer 3 protocol data unit. The packet switch 165 may be a traditional electronic switch, an electronic circuit, electronic router, a software router, a software switch, or the like.

The label generation unit 129 may map the data packet 170 to an FEC 210. The FEC 210 may identify a class of data packets 170 that should receive equivalent routing treatment. In one embodiment, the label generation unit 129 parses the header fields and/or the contents of the data packet 170, possibly selects and transforms parts or the total of the parsed information, and then uses the outcome as an index 140 to retrieve the FEC 210 from the FEC resolution table 163. One embodiment of the FEC resolution table 163 is described in more detail in FIG. 3E. Alternatively, the label generation unit 129 may hash the header field data to generate the FEC 210. In one embodiment, the FEC 210 identifies a destination node 150 for the data packet 170. Alternatively, the FEC 210 may identify both a multicast group and a priority class.

The label generation unit 129 may use the FEC 210 as an index to retrieve a label 240 from the label resolution table 120. The label 240 and the data packet 170 may be communicated to the optical transmitter 160. The optical transmitter 160 may convert the data packet 170 into an optical data packet and communicate the optical data packet over the optical fiber 130 in accordance with the label 240 as will be described hereafter. In one embodiment, the label 240 specifies one or more optical subcarriers of the optical fiber 130 over which the optical data packet is transmitted. In addition, the label 240 may specify one or more optical fibers 130 and/or one or more optical channels over which the optical data packet is transmitted as will be described hereafter.

In one embodiment, the label 240 is encoded as one of the optical fibers 130, one of the optical channels, and one or more of the optical subcarriers over which the optical data packet is communicated. As a result, the optical data packet is routed based on the optical fibers 130, the optical channels, and/or the optical subcarriers without sampling and processing a header or the contents of the optical data packet to determine the destination address of the optical data packet.

Figure 1C:
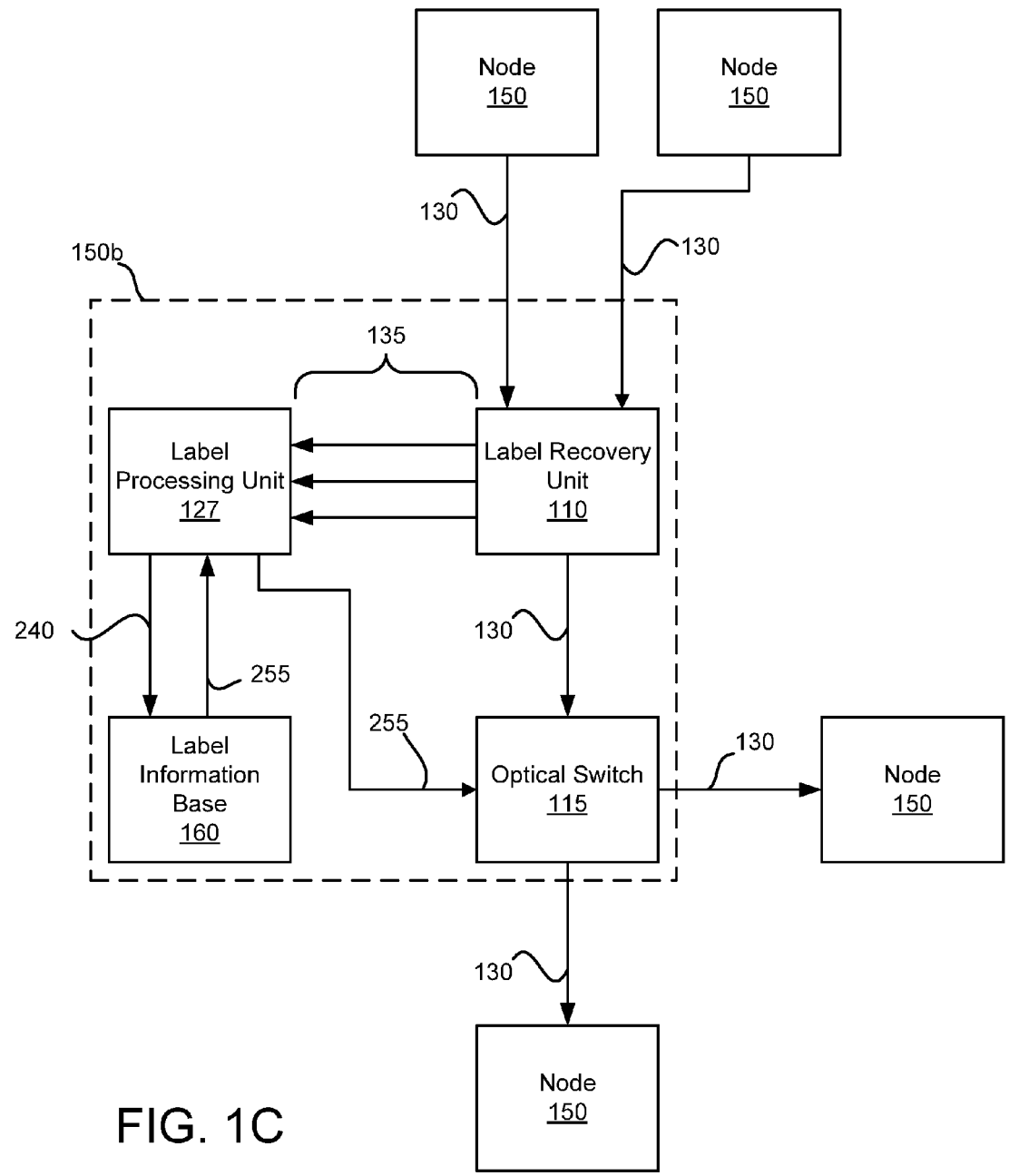
FIG. 1C is a schematic block diagram illustrating one embodiment of an optical intermediate node.

FIG. 1C is a schematic block diagram illustrating one embodiment of an optical intermediate node 150b. Optical data packets may arrive at the optical intermediate node 150b from other nodes 150 over optical fiber 130. The optical intermediate node 150b may route or both route and receive the optical data packets based on a routing action 255 associated with the label 240. In the depicted embodiment, the optical intermediate node 150b includes a label processing unit 127, a label recovery unit 110, a label information base 160, and an optical switch 115.

The label recovery unit 110 may sample the optical data packet as the optical data packet arrives on an optical fiber 130 and communicate sampled signals 135 to the label processing unit 127. The sampled signals 135 may identify the optical subcarriers, optical channels, and/or optical fiber 130 that are carrying the optical data packet. The label processing unit 127 may generate the label 240 from the sampled signals 135 and use the label 240 as an index to retrieve the routing action 255 from the label information base 160. The label processing unit 127 may communicate the routing action 255 to the optical switch 115. The optical switch 115 may be an optical switch fabric. The optical switch 115 may route the optical data packet based on the routing action 255. In one embodiment, the routing action 255 may specify an optical fiber 130 over which the optical data packet is routed. In addition, the routing action 255 may specify discarding the optical data packet or even both receiving and routing the optical data packet. The routing action 255 is described in more detail in FIG. 3D.

Figure 1D:
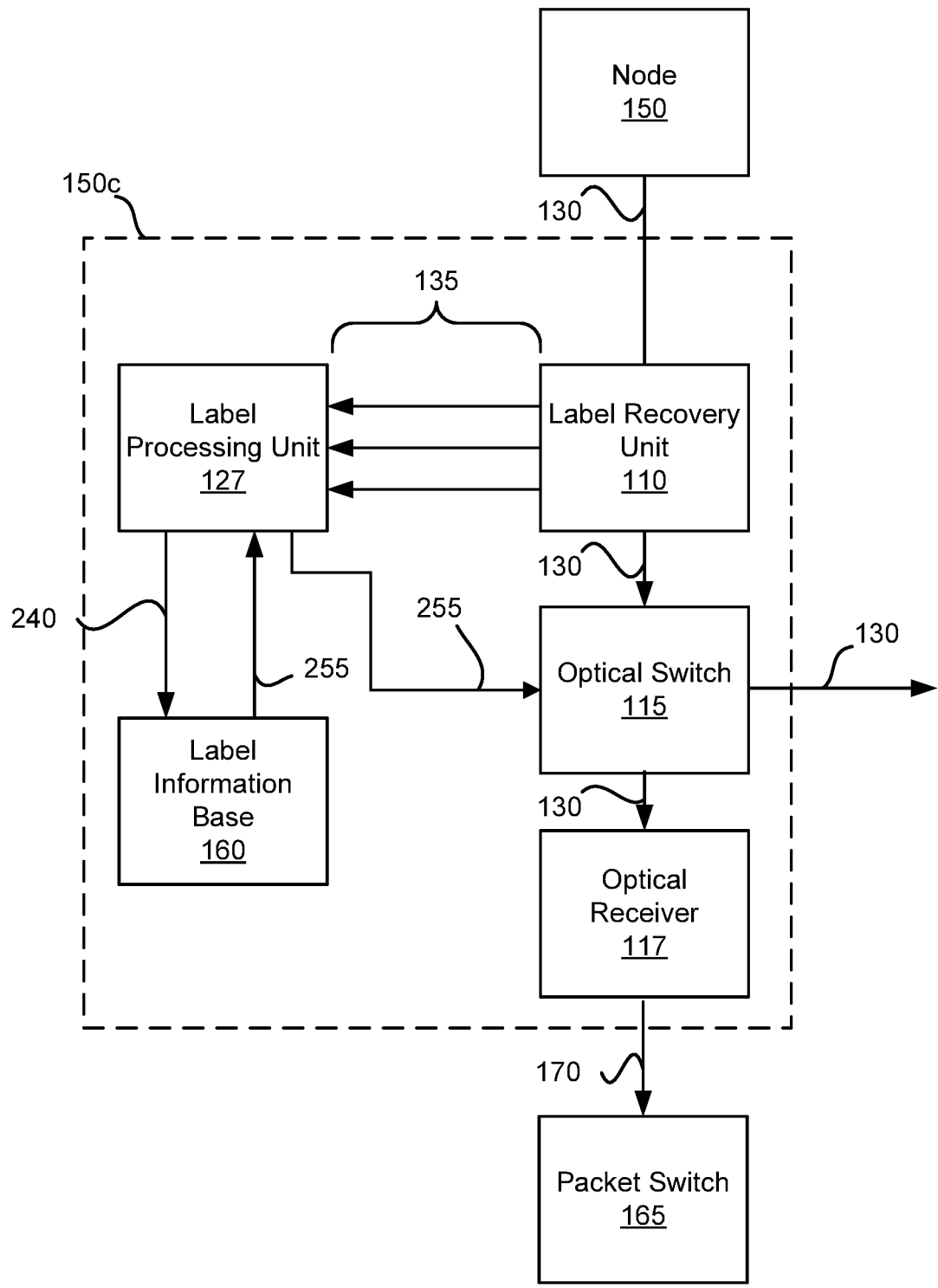
FIG. 1D is a schematic block diagram illustrating one embodiment of an optical receiver node.

FIG. 1D is a schematic block diagram illustrating one embodiment of an optical receiver node 150c. The optical receiver node 150c may receive optical data packets over the optical fiber 130 and route the optical data packets based on the routing action 255 associated with the label 240. In the depicted embodiment, the optical receiver node 150c includes the label processing unit 127, the label recovery unit 110, the label information base 160, the optical switch 115, and an optical receiver 117.

The label recovery unit 110 may sample the optical data packet as the optical data packet arrives over an optical fiber 130 and communicate sampled signals 135 to the label processing unit 127. The label processing unit 127 may generate the label 240 from the sampled signals 135 and use the label 240 is an index to retrieve our routing action 255 from the label information base 160. The label processing unit 127 may communicate the routing action 255 to the optical switch 115. The optical switch 115 may route the optical data packet based on the routing action 255.

Based on the routing action 255, the optical switch 115 may route the optical data packet over another optical fiber 130 such as to another node 150. Alternatively, based on the routing action 255, the optical switch 115 may route the optical data packet to the optical receiver 117 to receive the optical data packet. Alternatively, based on the routing action 255, the optical switch 115 may route the optical data packet to both the optical receiver 117 and over another optical fiber 130 towards another node 150. The optical receiver 117 may convert the optical data packet into a data packet 170 and communicate the data packet 170 to the packet switch 165. The packet switch 165 may be an electronic switch, an electronic circuit, a software switch, a software router, or the like.

Figures 2A, 2B:
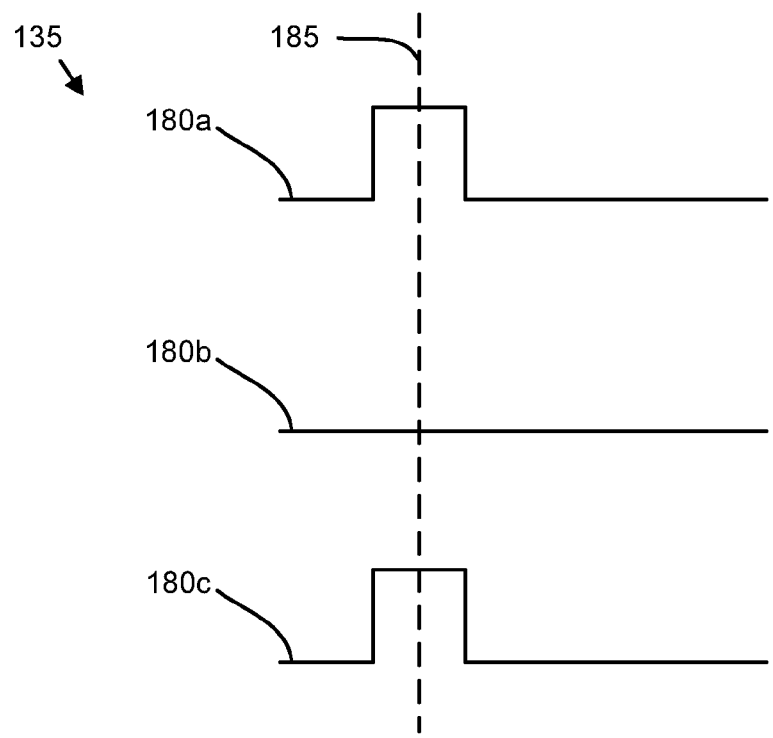
FIG. 2A is a drawing illustrating one embodiment of sampled signals on optical subcarriers.
FIG. 2B is a text diagram illustrating one embodiment of a label value.

FIG. 2A is a drawing illustrating one embodiment of sampled signals 135 on optical subcarriers 180. In the depicted embodiment, three optical subcarriers 180a-c are sampled at a sampling time 185 to generate the sampled optical signals 135. The optical subcarriers 180 with an asserted optical signal 135 may be detected as carrying the optical data packet. The label processing unit 127 may convert the sampled optical signals 135 into optical subcarrier values 225 as illustrated in FIG. 2B.

Figure 2C:
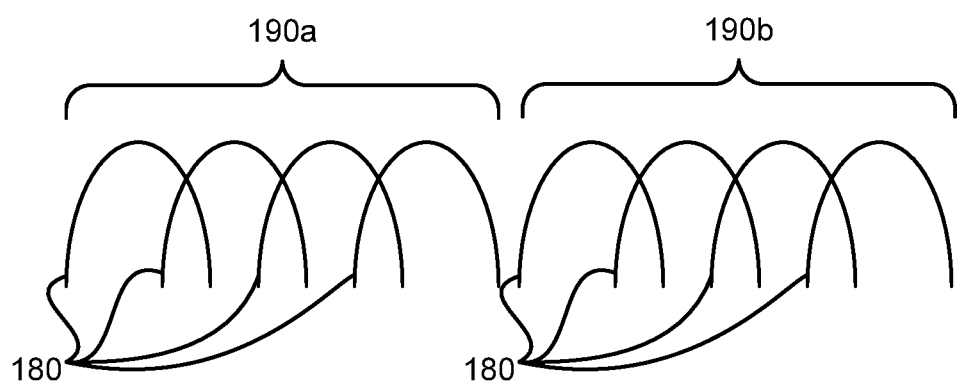
FIG. 2C is a drawing illustrating one embodiment of optical channels and optical subcarriers.

FIG. 2C is a drawing illustrating one embodiment of optical channels 190 and optical subcarriers 180. The optical fiber 130 may carry optical data packets using one or more optical channels 190, wherein each optical channel 190 specifies a range of subcarriers 180. In an alternate embodiment such as for wavelength division multiplexing, each optical channel 190 may be one wavelength. Each optical channel 190 may include one or more optical subcarriers 180. An optical data packet may be transmitted over one optical channel 190. In addition, the optical data packet may be transmitted using one or more optical subcarriers 180 within one optical channel 190. For example, a plurality of optical data packets may be transmitted at 400 Gigabytes per second (Gbs) by communicating the plurality of optical data packets over two optical subcarriers 190 at 200 Gbs per optical channel 190. Within each optical channel 190, the plurality of data packets may be transmitted over 20 optical subcarriers 180 at 10 Gbs.

Figure 3A:
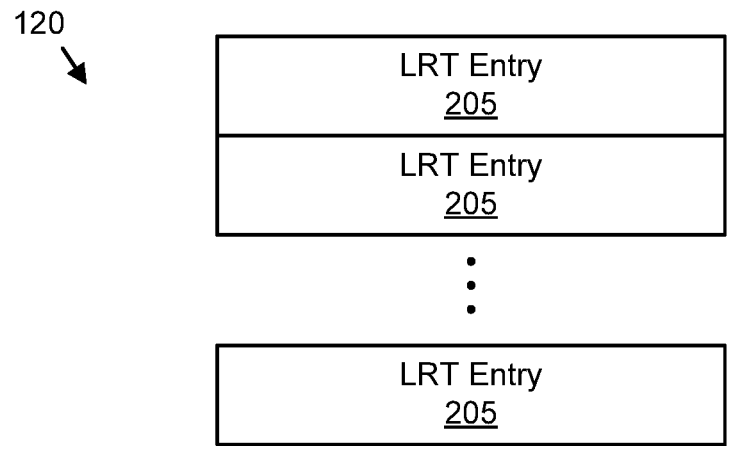
FIG. 3A is a schematic block diagram illustrating one embodiment of a label resolution table.

FIG. 3A is a schematic block diagram illustrating one embodiment of a label resolution table 120. The label resolution table 120 may be organized as a data structure in a memory such as the memory of the node 150. The label resolution table 120 includes a plurality of label resolution table entries 205. In one embodiment, the system controller 195 may organize the label resolution table 120. In addition, the system controller 195 may update the label resolution table entries 205 to manage routing in the optical network 100.

Figure 3B:
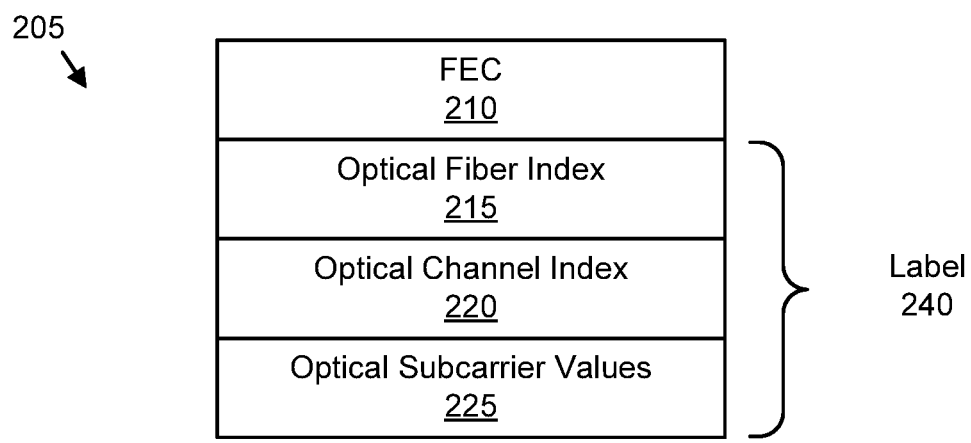
FIG. 3B is a schematic block diagram illustrating one embodiment of a label resolution table entry.
Figure 3C:
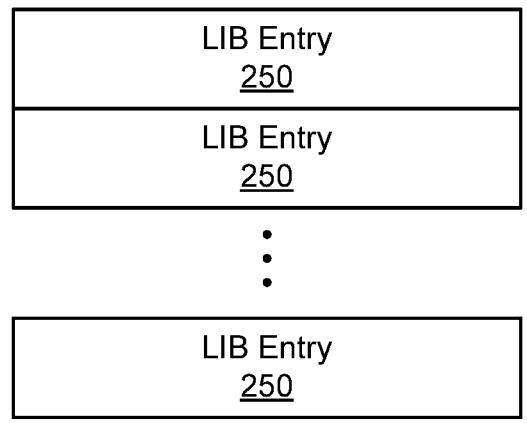
FIG. 3C is a schematic block diagram illustrating one embodiment of a label information base.

FIG. 3B is a schematic block diagram illustrating one embodiment of the label resolution table entry 205. Each label resolution table entry 205 may be organized as a data structure in a memory. In the depicted embodiment, the label resolution table entry 205 includes the FEC 210, an optical fiber index 215, an optical channel index 220, and optical subcarrier values 225.

The optical fiber index 215 may identify an optical fiber 130 over which the optical data packet is to be transmitted. In addition, the optical channel index 220 may identify an optical channel 190 of the optical fiber 130 over which the optical data packet is to be transmitted.

The optical subcarrier values 225 correspond to each of the plurality of optical subcarriers 180 over which the optical data packet is to be transmitted. In one embodiment, the optical subcarrier values 225 are organized as a set of Boolean values such as a string of bits. If a Boolean value and/or bit is asserted, the optical data packet may be transmitted over the optical subcarrier 180 that corresponds to the asserted Boolean value and/or bit.

In one embodiment, the label 240 includes one or more of the optical fiber index 215, the optical channel index 220, and the optical subcarrier values 225. For example, the label 240 may include only the optical subcarrier values 225. Alternatively, the label 240 may include the optical fiber index 215, the optical channel index 220, and the optical carrier values 225. In addition, the label 240 may include the optical fiber index 215 and the optical carrier values 225. In a certain embodiment, the label 240 includes the optical channel index 220 and the optical carrier values 225.

The FEC 210 may be used as an index to identify the label 240 for a data packet 170. Alternatively, header fields and/or the contents of the data packet 170 may be used to generate an index to identify the label 240.

3C is a schematic block diagram illustrating one embodiment of the label information base 160. The label information base 160 may be organized as a data structure in a memory. The label information base 160 may include a plurality of label information base entries 250. In one embodiment, the system controller 195 organizes the label information base 160. In addition, the system controller 195 may update the label information base entries 250 to manage the routing of optical data packets in the optical network 100.

Figure 3D:
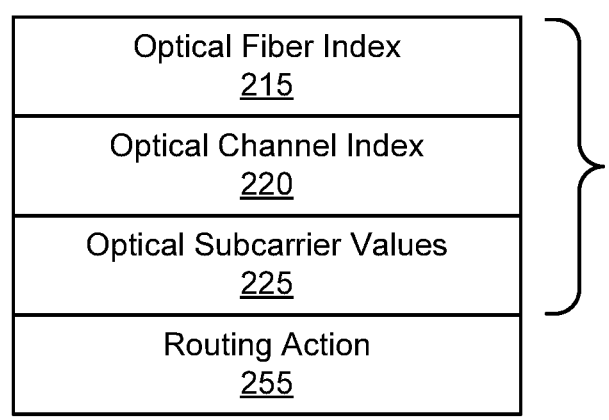
FIG. 3D is a schematic block diagram illustrating one embodiment of a label resolution table entry.

FIG. 3D is a schematic block diagram illustrating one embodiment of a label information base entry 250. In the depicted embodiment, the label information base entry 250 includes the optical fiber index 215, the optical channel index 220, the optical subcarrier values 225, and the routing action 255.

The optical fiber index 215 may identify an optical fiber 130 over which the optical data packet is transported. The optical channel index 220 may identify an optical channel 190 of the optical fiber 130 over which the optical data packet is transported. The optical subcarrier values 225 may correspond to each of a plurality of optical carriers 180 over which the optical data packet is transported. The label 240 may comprise one or more of the optical fiber index 215, the optical channel index 220, and the optical subcarrier values 225.

The routing action 255 may specify a transmission optical fiber index for routing the optical data packet over a given optical fiber 130 specified by the optical fiber index 215. Alternatively, the routing action 215 may specify receiving the optical data packet from the optical fiber 130 at the current node 150. In one embodiment, the routing action 255 specifies discarding the optical data packet.

In one embodiment, the label 240 may be used as an index to identify the routing action 255 for an arriving optical data packet. The optical data packet may be routed according to the routing action 255.

Figure 3E:
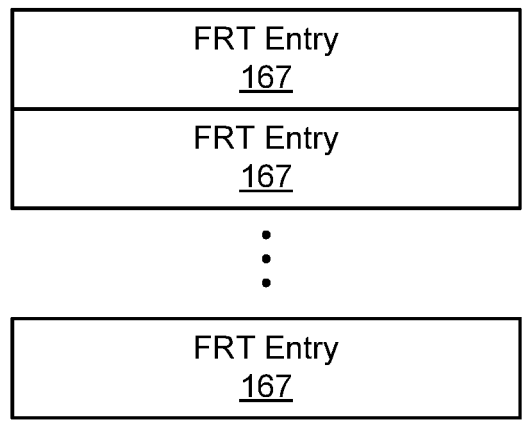
FIG. 3E is a schematic block diagram illustrating one embodiment of a forward equivalence class resolution table.

FIG. 3E is a schematic block diagram illustrating one embodiment of the FEC resolution table 163. The FEC resolution table 163 may be organized as a data structure in a memory. The FEC resolution table 163 may include a plurality of FEC resolution table entries 167. In one embodiment, the system controller 195 organizes the FEC resolution table 163. In addition, the system controller 195 may update the FEC resolution table entries 167 to manage the routing of optical data packets in the optical network 100.

Figure 3F:
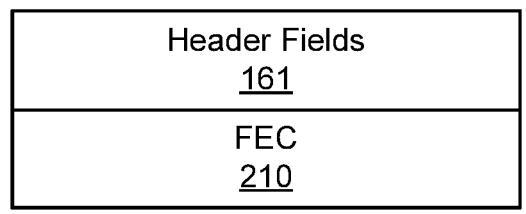
FIG. 3F is a schematic block diagram illustrating one embodiment of a forward equivalence class resolution table entry.

FIG. 3F is a schematic block diagram illustrating one embodiment of a FEC resolution table entry 167. The FEC resolution table entry 167 may be organized as a data structure in a memory. In the depicted embodiment, the FEC resolution table entry 167 includes header fields 161 and the FEC 210.

The header fields 161 may be header fields 161 of a data packet. The header fields 161 may indicate a destination address of the data packet 170. The header fields 161 may be used as an index to identify the FEC 210 for the data packet 170.

Figure 3G:
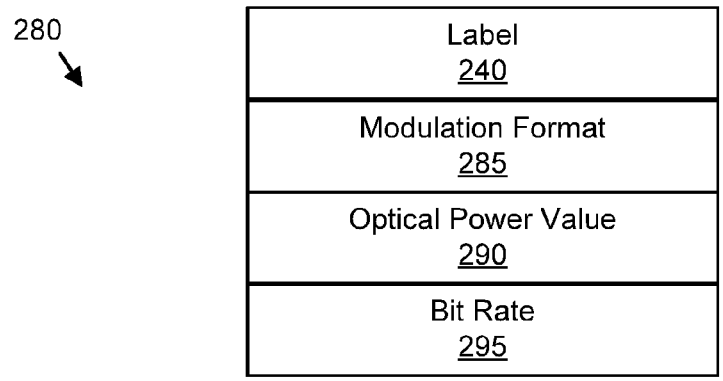
FIG. 3G is a schematic block diagram illustrating one embodiment of routing parameters.

FIG. 3G is a schematic block diagram illustrating one embodiment of routing parameters 280. The routing parameters 280 may be organized as a data structure in a memory. In the depicted embodiment, the routing parameters 280 include a modulation format 285, an optical power value 290, and a bit rate 295. In one embodiment, the routing parameters 280 are indexed by a label 240. In a certain embodiment, the routing parameters 280 are associated with a label resolution table entry 205. Alternatively, the routing parameters 280 may be associated with a label information base entry 250.

The modulation format 285 may specify the modulation format for the optical channel 190. The optical power value 290 may specify the optical power with which the optical data packet is transmitted over the optical fiber 130, optical channel 190, and optical subcarriers 180. The bit rate 295 may specify the transmission bit rate for transmitting the optical data packet over the optical fiber 130, optical channel 190, and optical subcarriers 180.

Figure 3H:
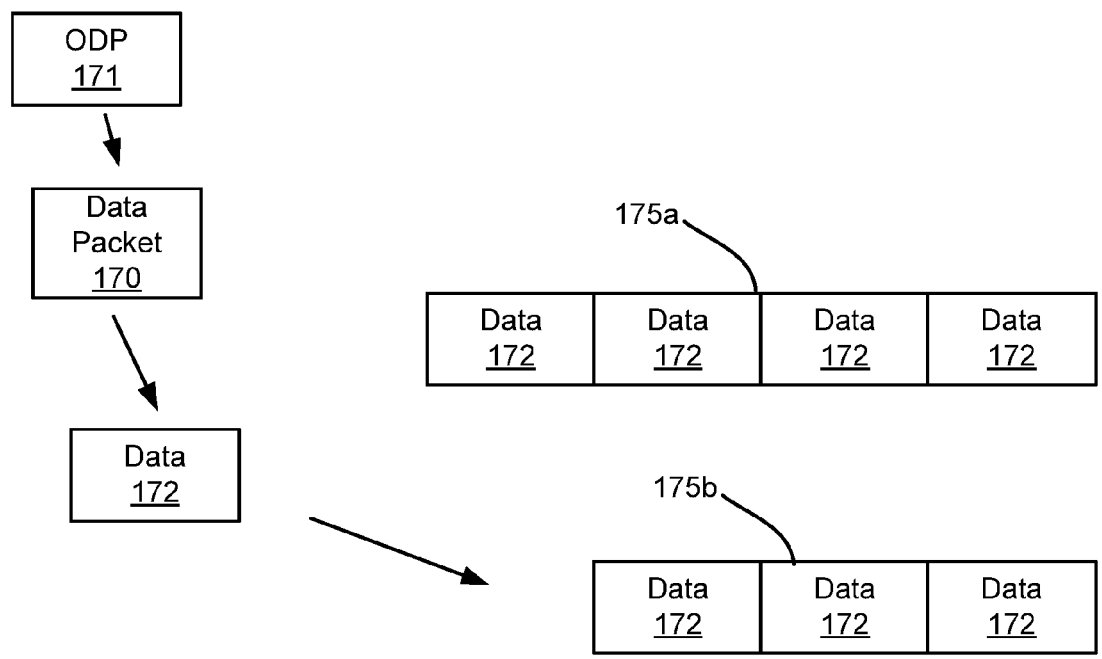
FIG. 3H is a schematic block diagram illustrating one embodiment of assigning data to data packets.

FIG. 3H is a schematic block diagram illustrating one embodiment of assigning data 172 from a data packet 170 carried by an optical data packet 171 to electronic data packets 175. In one embodiment, the data 172 may be assigned to an electronic data packet 175 at the receiving node 150c. The data 172 may be assigned in response to the label 240. In the depicted embodiment, a first electronic data packet 175a and a second electronic data packet 175b are shown. Data 172 from an optical data packet is assigned to the second electronic data packet 175b in response to the label 240. For example, the optical subcarrier values 225 of the label 240 may specify that the data 172 is assigned to the second electronic data packet 175b. In one embodiment, the data 172 is the data packet 170. Alternatively, the data 175 may be a portion of the data packet 170.

Figure 4:
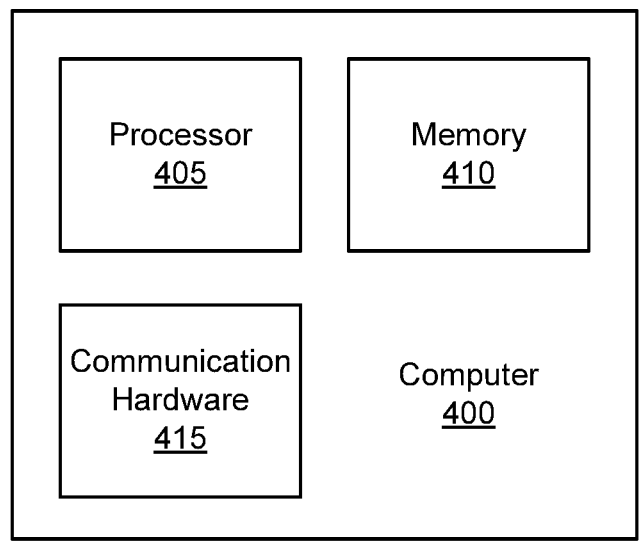
FIG. 4 is a schematic block diagram illustrating one embodiment of a computer.

FIG. 4 is a schematic block diagram illustrating one embodiment of a computer 400. In one embodiment, each node 150 includes one or more computers 400. The computer 400 may embody the FEC resolution table 163, the label generation unit 129, the label resolution table 120, the label processing unit 127, and/or the label information base 160. In the depicted embodiment, the computer 400 includes a processor 405, a memory 410, and communication hardware 415. The memory 410 may comprise a semiconductor storage device, a hard disk drive, an optical storage device, a micromechanical storage device, or combinations thereof. The memory 410 may store code. The processor 405 may execute the code. The communication hardware 415 may communicate with other devices.

Figure 5A:
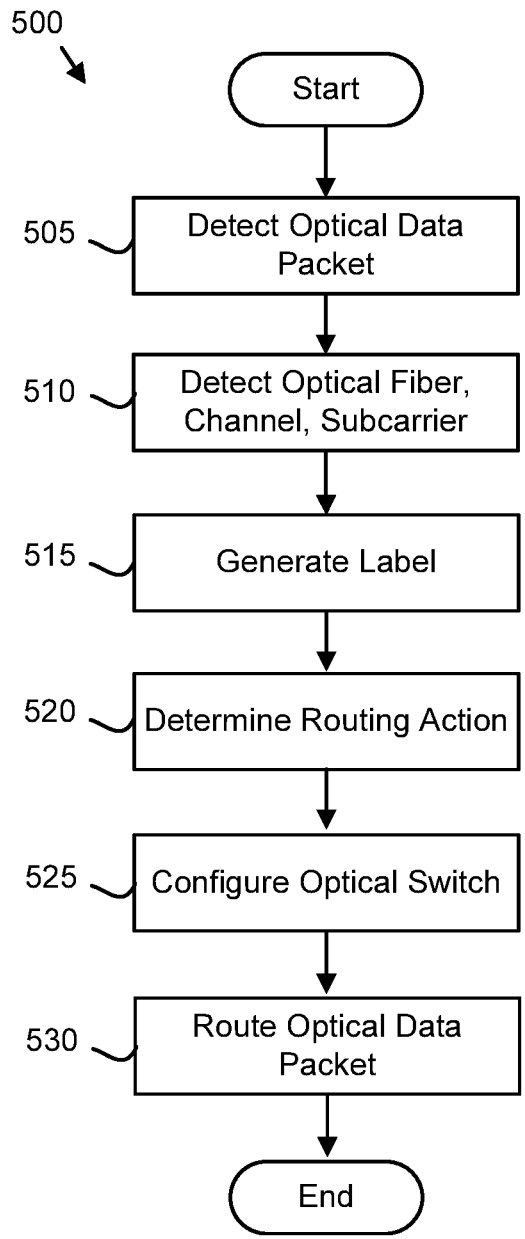
FIG. 5A is a schematic flow chart diagram illustrating one embodiment of an optical data packet routing method.

FIG. 5A is a schematic flow chart diagram illustrating one embodiment of an optical data packet routing method 500. The method 500 may route an incoming optical data packet 171. In one embodiment, the optical data packet 171 may be routed at an optical intermediate node 150b. The method 500 may be performed by the processor 405.

The method 500 starts, and in one embodiment, the processor 405 detects 505 the optical data packet 171. The processor 405 may detect 505 the optical data packet 171 arriving at the label recovery unit 110. The optical data packet 171 may be communicated over at least one optical subcarrier 180 of a plurality of optical subcarriers 180. The optical data packet 171 may be detected as a sampled signal 135.

The processor 405 may further detect 510 each of the plurality of optical subcarriers 180 over which the optical data packet 171 is carried. In one embodiment, the optical subcarriers 180 with an asserted sampled signal 135 are detected 510 as carrying the optical data packet 171 as illustrated in FIG. 2A. In addition, the processor 405 may detect 510 the optical fiber 130 and the optical channel 190 over which the optical data packet 171 is carried.

The processor 405 may generate 515 the label 240 based on one or more of the optical subcarriers 180 over which the optical data packet 171 is carried, the optical fiber 130 over which the optical data packet 171 is carried, and the optical channel 190 over which the optical data packet 171 is carried. For example, the label 240 may comprise one or more asserted optical carrier values 225 corresponding to each of the plurality of optical carriers 180 over which the optical data packet 171 is carried. In addition, the label 240 may include the optical fiber index 215 that corresponds to the optical fiber 130 over which the optical data packet 171 is carried and/or the optical channel index 220 that corresponds to the optical channel 190 over which the optical data packet 171 is carried.

The processor 405 may determine 520 the routing action 255. In one embodiment, the label 240 is used as an index to retrieve the routing action 255 from the label information base 160. Alternatively, the processor may calculate the routing action 255 as a function of the label 240.

In one embodiment, the processor 405 configures 525 the optical switch 115. The optical switch 115 may be configured 525 using the routing parameters 280. For example, the label 240 may be used as an index to retrieve the routing parameters 280.

The processor 405 may route 530 the optical data packet 171 from the optical switch 115 based on the routing action 255 associated with the label 240 and the method 500 ends.

For example, the optical switch 115 may route 530 the optical data packet 171 over the optical fiber 130 specified by a transmission optical fiber index of the routing action 255. In one embodiment, the optical channel 190 and the optical subcarriers 180 are unchanged.

In one embodiment, the optical data packet 171 is routed 530 over the discard output port. Alternatively, the optical data packet 171 may be routed 530 to an optical receiver 117 that converts the optical data packet 171 into an electronic data packet 170. The data packet 170 may further be routed by the packet switch 165 based on the header fields 161 of the data packet 170.

Figure 5B:
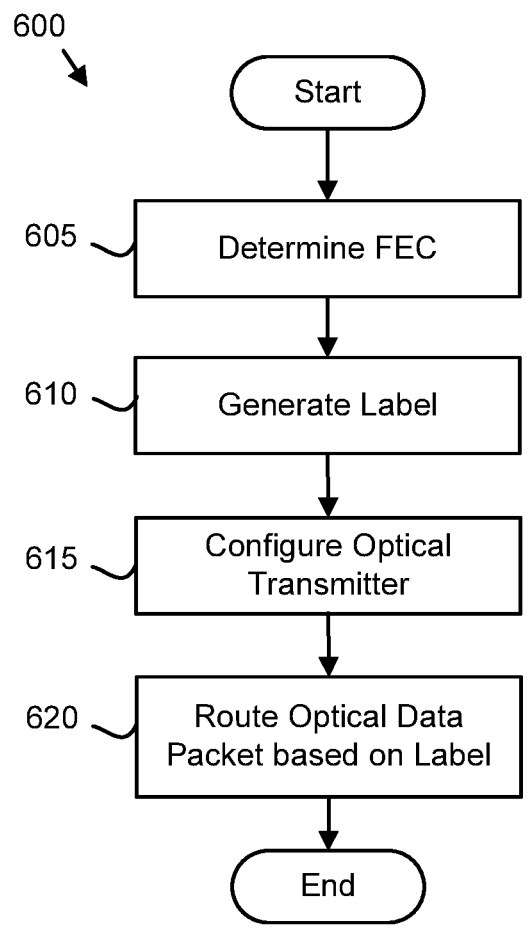
FIG. 5B is a schematic flow chart diagram illustrating one embodiment of an optical data packet transmission method.

FIG. 5B is a schematic flow chart diagram illustrating one embodiment of an optical data packet transmission method 600. The method 600 may transmit an optical data packet 171 from an optical transmitter node 150b. The method 600 may be performed by a processor 405.

The method 600 starts, and in one embodiment, the processor 405 determines 605 the FEC 210 for a data packet 170. In one embodiment, the processor 405 parses header fields 161 from the data packet 170 and uses the header fields 161 as an index to retrieve the FEC 210 from the FEC resolution table 163. Alternatively, the processor 405 may hash the header fields 161 to generate the FEC 210.

The processor 405 may further generate 610 the label 240. In one embodiment, the processor 405 uses the FEC 210 as an index to retrieve the label 240 from the label resolution table 120. Alternatively, the processor 405 may calculate the label 240 as a function of the FEC 210.

In one embodiment, the processor 405 configures 615 the optical transmitter 160. The optical transmitter 160 may be configured 615 using the routing parameters 280. For example, the label 240 may be used as an index to retrieve the routing parameters 280. The processor 405 may configure 615 the optical transmitter 160 to transmit the optical data packet 171 using the modulation format, optical power, and/or bit rate specified by the routing parameters 280.

The processor 405 may route 620 the optical data packet 171 over at least one optical subcarrier 180 as indicated by the label 240 and the method 600 ends. The optical data packet 171 may comprise the original data packet 170. In addition, the label 240 may specify one of the optical fibers 130 and/or one of the optical channels 190. For example, the optical data packet 171 may be routed 620 over the optical fiber 130 associated with the optical fiber index 215, the optical channel 190 associated with the optical channel index 220, and one or more optical subcarriers 180 associated with the optical subcarrier values 225.

Figure 5C:
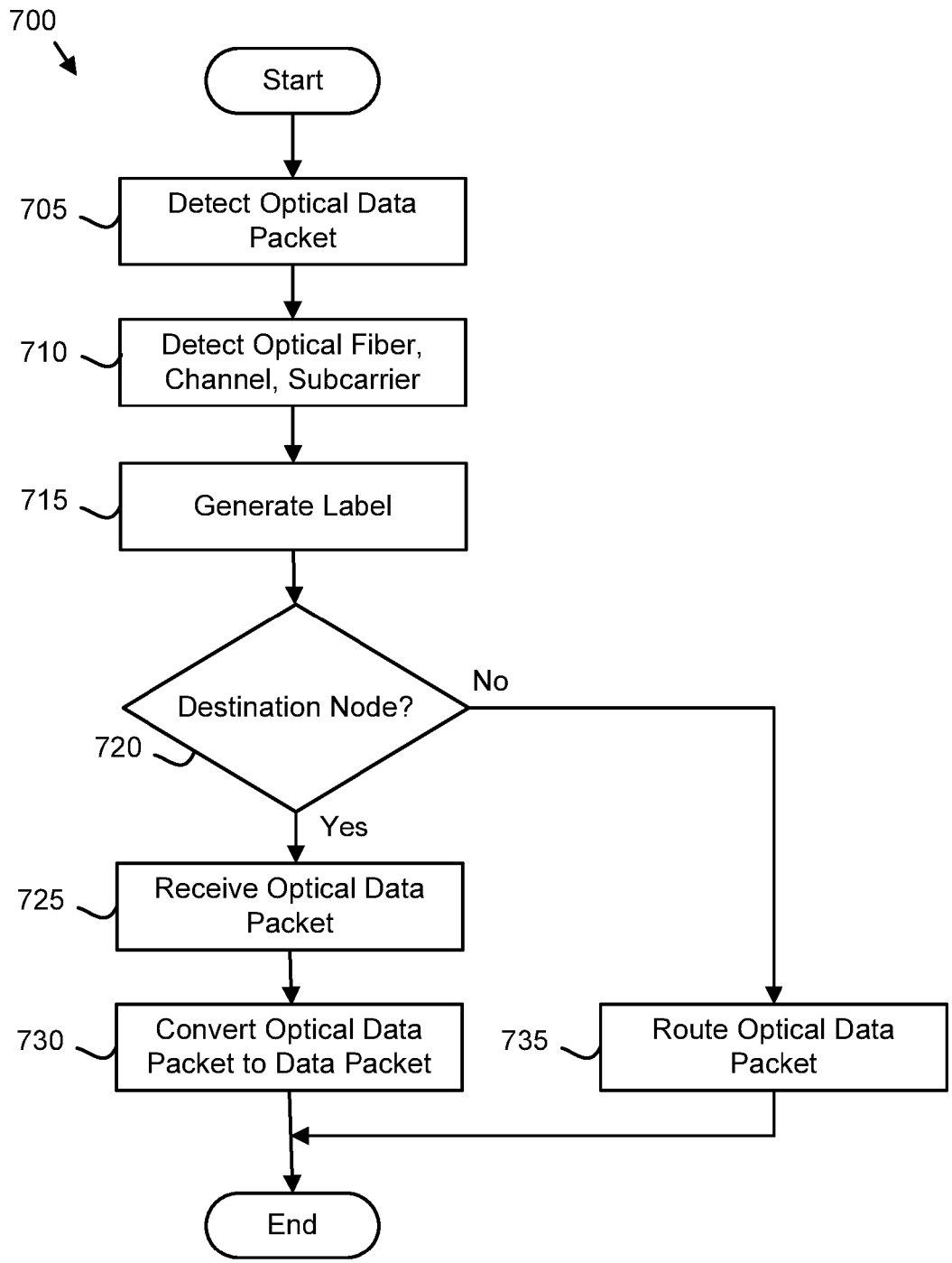
FIG. 5C is a schematic flowchart diagram illustrating one embodiment of an optical data packet receiving method.

FIG. 5C is a schematic flowchart diagram illustrating one embodiment of an optical data packet receiving method 700. The method 700 may receive the optical data packet 171 at an optical receiver node 150c. In one embodiment, the method 700 is performed by a processor 405.

The method 700 starts, and in one embodiment, the processor 405 detects 705 the optical data packet 171. In one embodiment, the optical data packet 171 is detected 705 using the label recovery unit 110. The optical data packet 171 may be communicated over at least one optical subcarrier 180 of a plurality of optical subcarriers 180. The optical data packet 171 may be detected as a sampled signal 135.

The processor 405 may further detect 710 each of the plurality of optical subcarriers 180 over which the optical data packet 171 is carried. In one embodiment, the optical subcarriers 180 with an asserted sampled signal 135 are detected 510 as carrying the optical data packet 171 as illustrated in FIG. 2A. In addition, the processor 405 may detect 710 the optical fiber 130 and the optical channel 190 over which the optical data packet 171 is carried.

The processor 405 may generate 715 the label 240 based on one or more of the optical subcarriers 180 over which the optical data packet 171 is received, the optical fiber 130 over which the optical data packet 171 is received, and the optical channel 190 over which the optical data packet 171 is received. For example, the label 240 may comprise one or more asserted optical carrier values 225 corresponding to each of the plurality of optical carriers 180 over which the optical data packet 171 is carried. In addition, the label 240 may include the optical fiber index 215 that corresponds to the optical fiber 130 over which the optical data packet 171 is carried, the optical channel index 220 that corresponds to the optical channel 190 over which the optical data packet 171 is carried.

In one embodiment, the processor 405 determines 720 if a receiving node such as the current optical receiver node 150c is the destination node 150 of the optical data packet 171. The processor 405 may retrieve the routing action 255 from the label information base 160 using the label 240 as an index. The routing action 255 may specify that the current optical receiver node 150c is the destination node 150. Alternatively, the routing action 255 may specify that the current optical receiver node 150c is not the destination node 150.

If the current optical receiver node 150c is not the destination node 150, the processor 405 may route 735 the optical data packet 171 and the method 700 ends. The processor 405 may route 735 the optical data packet 171 from the optical switch 115 based on the routing action 255 associated with the label 240. For example, the optical switch 115 may route 530 the optical data packet 171 over the optical fiber 130 specified by the optical fiber index 215. In one embodiment, the optical channel 190 and the optical subcarriers 180 are unchanged.

If the current optical receiver node 150c is the destination node 150, the processor 405 may direct the optical receiver 117 to receive 725 the optical data packet 171 and convert 730 the optical data packet 171 to an electronic data packet 170 and the method 700 ends. In addition, the data packet switch 165 may route the electronic data packet.

The embodiments described herein detect each of the plurality of optical subcarriers 180 over which the optical data packet 171 is carried and generate the label 240 comprising the one or more asserted optical subcarrier values 225 corresponding to each of the plurality of optical subcarriers 180 over which the optical data packet 171 is received. In addition, the embodiments may detect the optical fiber 130 and/or the optical carrier 190 and generate the label 240 with the optical fiber index 215 and/or the optical channel index 220. The optical data packet 171 may be optically routed based on the routing action 255 associated with the label 240. As a result, the optical data packet 171 may be optically routed within the optical network 100, greatly increasing the overall transmission rate and efficiency for the optical network 100.

The system controller 195 may manage the routing of the optical data packets 171 within the optical network 100 by modifying the label resolution table 120, the label information base 160, and the FEC Resolution Table 163. As a result, the optical network 100 may route optical data packets 171 as directed by the system controller 195.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an optical switch that switches optical data;
   a processor;
   a memory that stores code executable by the processor to:
   detect an optical data packet communicated over at least one optical subcarrier of a plurality of optical subcarriers;
   detect each of the plurality of optical subcarriers over which the optical data packet is carried;
   generate a label comprising one or more asserted optical subcarrier values corresponding to each of the plurality of optical subcarriers over which the optical data packet is carried; and
   route the optical data packet from the optical switch based on a routing action associated with the label.

2. The apparatus of claim 1, wherein the label further comprises an optical fiber index that identifies an optical fiber over which the optical data packet is carried and an optical channel index that identifies an optical channel over which the optical data packet is carried.

3. The apparatus of claim 2, wherein the code is further executable by the processor to detect the optical fiber and the optical channel over which the optical data packet is carried.

4. The apparatus of claim 1, wherein the routing action specifies a transmission optical fiber index for routing the optical data packet over a given optical fiber.

5. The apparatus of claim 1, wherein the code is further executable by the processor to:
   determine a Forward Equivalence Class (FEC) for a data packet, wherein the FEC identifies a class of data packets that receive equivalent routing;
   generate the label from the FEC; and
   route the optical data packet over at least one optical subcarrier as indicated by the label, wherein the optical data packet comprises the data packet.

6. The apparatus of claim 1, wherein the code is further executable by the processor to:
   detect the optical data packet;
   detect each of the plurality of optical subcarriers over which the optical data packet is carried;
   generate the label comprising the one or more asserted optical subcarrier values corresponding to each of the plurality of optical subcarriers over which the optical data packet is carried; and
   generate a data packet from the optical data packet in response to an optical receiver node being a destination node.

7. A method comprising:
   detecting, by use of a processor, an optical data packet communicated over at least one optical subcarrier of a plurality of optical subcarriers;
   detecting each of the plurality of optical subcarriers over which the optical data packet is carried;
   generating a label comprising one or more asserted optical subcarrier values corresponding to each of the plurality of optical subcarriers over which the optical data packet is carried; and
   routing the optical data packet from the optical switch based on a routing action associated with the label.

8. The method of claim 7, wherein the label further comprises an optical fiber index that identifies an optical fiber over which the optical data packet is carried and an optical channel index that identifies an optical channel over which the optical data packet is carried.

9. The method of claim 8, wherein the method further comprises detecting the optical fiber and the optical channel over which the optical data packet is carried.

10. The method of claim 7, wherein the routing action specifies a transmission optical fiber index for routing the optical data packet over a given optical fiber.

11. The method of claim 7, wherein the method further comprising:
    determining a Forward Equivalence Class (FEC) for a data packet, wherein the FEC identifies a class of data packets that receive equivalent routing;
    generating the label from the FEC; and
    routing the optical data packet over the at least one optical subcarriers as indicated by the label, wherein the optical data packet comprises the data packet.

12. The method of claim 7, wherein the method further comprises:
    detecting the optical data packet;
    detecting each of the plurality of optical subcarriers over which the optical data packet is carried;
    generating the label comprising the one or more asserted optical subcarrier values corresponding to each of the plurality of optical subcarriers over which the optical data packet is carried; and
    generating a data packet from the optical data packet in response to an optical receiver node being a destination node.

13. A program product comprising a non-transitory computer readable storage medium that stores code executable by a processor, the executable code comprising code to perform:
    detecting an optical data packet communicated over at least one optical subcarrier of a plurality of optical subcarriers;
    detecting each of the plurality of optical subcarriers over which the optical data packet is carried;
    generating a label comprising one or more asserted optical subcarrier values corresponding to each of the plurality of optical subcarriers over which the optical data packet is carried; and
    routing the optical data packet from the optical switch based on a routing action associated with the label.

14. The program product of claim 13, wherein the label further comprises an optical fiber index that identifies an optical fiber over which the optical data packet is received and an optical channel index that identifies an optical channel over which the optical data packet is carried.

15. The program product of claim 14, wherein the code further performs detecting the optical fiber and the optical channel over which the optical data packet is carried.

16. The program product of claim 13, wherein the routing action specifies a transmission optical fiber index for routing the optical data packet over a given optical fiber.

17. The program product of claim 13, wherein the processor further performs:
    determining a Forward Equivalence Class (FEC) for a data packet, wherein the FEC identifies a class of data packets that receive equivalent routing;
    generating the label from the FEC; and
    routing the optical data packet over the at least one optical subcarriers as indicated by the label, wherein the optical data packet comprises the data packet.

18. The program product of claim 13, wherein the processor further performs:
    detecting the optical data packet;

detecting each of the plurality of optical subcarriers over which the optical data packet is carried;

generating the label comprising the one or more asserted optical subcarrier values corresponding to each of the plurality of optical subcarriers over which the optical data packet is carried; and generating a data packet from the optical data packet in response to an optical receiver node being a destination node.

* * * * *